US010596750B1

(12) United States Patent
Cros et al.

(10) Patent No.: US 10,596,750 B1
(45) Date of Patent: Mar. 24, 2020

(54) BOW SPREADER

(71) Applicants: Laurent Cros, Gloucester, MA (US); Nicholas C. Green, Cayuga, NY (US)

(72) Inventors: Laurent Cros, Gloucester, MA (US); Nicholas C. Green, Cayuga, NY (US)

(73) Assignee: Pearl Technologies, Inc., Savannah, NY (US)

( * ) Notice: Subject to any disclaimer, the term of this patent is extended or adjusted under 35 U.S.C. 154(b) by 0 days.

(21) Appl. No.: 16/179,367

(22) Filed: Nov. 2, 2018

(51) Int. Cl.
*B29C 55/08* (2006.01)
*B65H 23/022* (2006.01)

(52) U.S. Cl.
CPC .......... *B29C 55/08* (2013.01); *B65H 23/022* (2013.01); *B65H 2404/511* (2013.01); *B65H 2404/62* (2013.01); *B65H 2701/1752* (2013.01)

(58) Field of Classification Search
CPC ................. B29C 55/08; B65H 23/022; B65H 2701/1752; B65H 2404/62; B65H 2404/511
See application file for complete search history.

(56) References Cited

U.S. PATENT DOCUMENTS 2,722,415 A 11/1955 Wood, Jr.
3,072,353 A 1/1963 Moser
3,171,579 A 3/1965 Robertson
3,266,743 A 8/1966 Moser et al.
3,463,377 A * 8/1969 Lucas ................. B65H 18/145 242/615
4,410,122 A 10/1983 Frye et al.
4,669,646 A 6/1987 Oinonen
4,805,274 A 2/1989 Gallant
5,453,069 A 9/1995 Snyder et al.
6,113,026 A 9/2000 Pottorff
6,358,368 B1 3/2002 Bernert et al.
6,488,230 B2 12/2002 Porter
7,004,219 B2 2/2006 Nelson
9,682,838 B2 6/2017 Cros et al.

* cited by examiner

*Primary Examiner* — Sang K Kim
(74) *Attorney, Agent, or Firm* — Bernhard P. Molldrem, Jr.

(57) ABSTRACT

A bow spreader bar provides lateral stress on a web of plastic film as it travels past. An elongated arcuate bow member is supported on a rotatable support bar that can be rotated by a first actuator to adjust pitch angle of the bow member relative to the plane of the film. A second actuator mounted on a midportion of the rotatable bar has a rod connected to a center part of the arcuate member and adjusts the amount of bow or arc of the arcuate member. A remote control arrangement has a receiver coupled to the first and second actuators and a remote transmitter permitting an operator to control the pitch angle and amount of bow from a location remote from the film processing equipment.

8 Claims, 4 Drawing Sheets

11
22
20
14
19
30
18
31

BOW SPREADER

BACKGROUND OF THE INVENTION

This invention relates to plastic film handling and processing equipment, and is more specifically directed to an improved bow spreader bar for stretching the web of film transversely as it passes between a supply roll and a pick-up roll so as to eliminate creases and wrinkles in the plastic film. The invention is more particularly concerned with improvements to the bow spreader that permits rapid and accurate change in the arc or bow and also in the pitch angle of the arcuate member relative to the film web, and in making it possible to adjust the pitch angle and arc remotely, which facilitate set up and adjustment where the film path is in an elevated or difficult location. The concepts of the present invention can reduce maintenance issues, and can eliminate problems of catching or tearing of the film.

Polyethylene film or films of other plastic materials are typically produced as elongated webs of film and are stored as rolls of plastic film for further processing. The film can be fed from a supply roll, through one or more processing stages, and then taken up on another roll. This processing can include printing, die cutting, punching, seam forming etc. Typically, the web of film has a stress imposed on it in the longitudinal direction of the web, i.e., the “machine” direction, with relatively less stress imposed in the transverse direction. As a result, the plastic film can become creased or wrinkled prior to being rewound on the take-up roll. These creases and similar flaws can interfere with subsequent printing, punching, or cutting steps, and can decrease the value of the end product. Consequently, it has become the practice in plastic film handling to impose a transverse stress on the film web by means of a bow or arm.

The bow spreader is typically positioned adjacent to the plane of the web in advance of the take-up roll. The bow spreader is arced or bowed so as to press into the web, and can be arranged so as to penetrate the web plane at an angle perpendicular to the web plane, although the pitch of the bow spreader can be set to a lower angle. Commonly, bow spreaders are formed as a bowed rod carrying a row of rollers end to end. There can be a rubber covering over the rollers. The intention is that the rollers and covering will turn or rotate about the rod. In order to turn the existing bow rollers, the bow has to press heavily into web and create significant web tension. Alternatively, the rollers may be power-driven to match the line speed. In that case the powered bow spreader bar requires a speed sensor and a feedback circuit so that the rollers match the line speed exactly. This increases the cost and complexity of the device. There is also wear on the rollers from use as they rub against one another. The bowing of the spreader creates gaps between rollers on the convex side, which can catch on the film web and on the covering. All of these factors mean that the roller-based spreader bars are expensive and complex and require considerable maintenance.

An improvement to the roller-based spreader bar is found in a static bar that may be formed of a metal extrusion with an arcuate cap or contact surface that is treated with a low-friction surface treatment, and which may employ a low-friction semi-rigid cover fitted onto it. One example of this is found in U.S. Pat. No. 6,113,026 to Pottorff. This improved bow spreader bar has a film-facing surface formed of a low-friction material, and can take the form of an extruded arcuate member adapted to be positioned transversely in contact with the film web. This can have a rounded contact surface over which the film slips past. As shown in that U.S. Patent, the extrusion may be in the form having a generally T-shaped profile with a top that forms the curved or arcuate contact surface and a step that may be formed of one or two tubular components, which may serve as a conduit for a cooling fluid. The surface treatment may take the form of a lubrication hard-coating impregnated into the extrusion, which favorably is an aluminum alloy. A suitable semi-rigid plastic resin cover may be fitted onto the top of the extruded bow spreader bar, which may have an incorporated low friction agent.

A need remains to simplify the adjustment of bowing needed for the spreader bar for each given run of plastic film, and also to adjust the pitch angle of the bow along the transverse axis, and to enable the bow spreader bar to be set and adjusted remotely to avoid having to send a worker into a potentially difficult or dangerous zone within the film processing equipment.

A need also exists for a bow spreader bar that can be easily and quickly adjusted during set up or during a run, if necessary, without requiring the worker to put his or her hands on the equipment.

OBJECTS AND SUMMARY OF THE INVENTION

Accordingly, it is an object of this invention to provide an improvement for bow spreaders and bow spreader bars of the type that are employed in the plastic film processing industry.

It is more particular object to provide a bow spreader bar that is motorized for the adjustment of bow and of pitch angle.

It is another object of the invention to provide a bow spreader bar that can be adjusted from a remote location away from the bow spreader bar, and which avoids having the operator having to be on or next to the film processing equipment.

A further object is to facilitate adjustment of both pitch angle and bow of the bow spreader bar from a single control device at location convenient to the user.

According to one aspect of the present invention, a bow spreader bar arrangement is situated in or on the frame of a plastic film processing line for laterally stressing a web drawn past it, where the film web is unwound from a supply roll, processed in a processing stage, and then rewound onto a take-up roll. The bow spreader bar arrangement employs an elongated arcuate member that has first and second axial ends disposed transversely with respect to the web of film. The spreader bar arrangement is non-rotating, i.e., not formed or rollers or the like, and has a profile that defines a rounded surface on a convex face of the elongated arcuate member. The rounded surface is the portion that contacts the film, and has a low-friction treatment applied to it so that the film web slides past.

An axial support member, i.e., a rotatable support bar or tube, extends across the machine frame from a first rotary support member to a second rotary support member where the first and second ends of the rotatable support member are respectively journaled.

An actuator coupled to one end of the axial support member controllably rotates it, and with it adjusts the pitch angle of the elongated arcuate member of the spreader bar relative to the plane of the film web, as desired for a given processing operation. A second linear actuator is mounted on the axial support member; this actuator has a rod extending from it to a center of the elongated arcuate member. The rod is controllable moved radially out or in to adjust the radial position of the center of the elongated arcuate member relative to the axial support member. In other words, the second actuator controls the amount of bowing or depth of penetration of the spreader bar into the web.

To permit the operator to adjust the pitch angle and bowing without having to actually climb onto the equipment, a remote controller arrangement is provided. This has a remote transmitter component that favorably may be distant from the bow spreader bar and a receiver component mounted on the bow spreader bar and coupled with both the first and second actuators. The remote controller arrangement is configured to permit the operator to adjust pitch angle and radial position (bowing) from a location remote from the bow spreader bar.

In a preferred arrangement the elongate arcuate member is formed as an extrusion having a generally T-shaped profile with a cap portion that is curved and a stem portion on which the cap portion is centered. The rounded surface of the elongated arcuate member most favorably includes a low-friction surface treatment. One or more removable and replaceable cap member(s) may be provided formed of a low-friction plastic resin and being shaped and adapted to slide onto the rounded surface of said elongated arcuate member. These can be made of different materials for the different films to be processed, and color-coded to identify the associated type of film.

Most favorably, the first actuator includes a linear motor fixed onto a rotary support for axial support member and has a movable portion attached onto a lever that is affixed to the end of the axial support member. The second linear actuator can be mounted onto the axial support member radially opposite the center of the elongated arcuate member. The rod of the second linear actuator can extend through the axial support member to the center of said elongated arcuate member. In a preferred construction, the receiver component of the remote controller arrangement is mounted onto second linear actuator. The receiver component and the transmitter component of the remote controller arrangement can be configured for wireless communication with one another, at least for short distances, e.g., with radio frequency waves such as Bluetooth, infrared, ultrasonic, or other convenient means for effective communication without significant interference.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENTS

Figure 1:
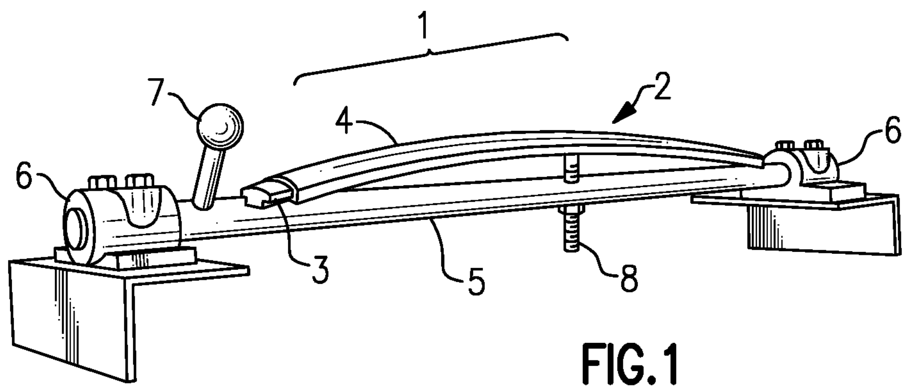
FIG. 1 is a perspective view of a spreader bar arrangement according to one example of the prior art.

With reference to the Drawing, FIG. 1 illustrates a spreader bar arrangement of the prior art, and in particular, a bow spreader bar of the type generally disclosed in prior U.S. Pat. No. 6,113,026, based on a bowed or arcuate aluminum extrusion of a generally T-shaped profile, which may have a removable plastic wear piece. In this earlier bow spreader bar assembly 1, the bow spreader bar is non-rotating, and presents a low-friction surface to the film web that travels past it. An arcuate spreader bar 2 is formed of as a continuous aluminum extrusion 3, and a low friction wear cover or cap 4. The bar 2 is mounted onto a transverse support member 5, which can be in the form of a tube or beam, with corner mounts 6 in which ends of the transverse support member 5 are journalled. The corner mounts 6 are attached onto a frame (not shown) of the plastic film processing assembly. An adjustment lever 7 adjusts the pressure or squeeze at the ends of the extrusion to increase or decrease the amount of curvature or bowing, and also adjusts the position of the bow spreader bar relative to the plane of the film web. An adjustment screw 8 passes through the support member 5 and the back side of the extrusion 3. This supports the bow spreader bar 3 at its center, and can adjust the amount of curvature of the bow and the depth of penetration of the bow spreader bar into the plane of the film.

Figure 2:
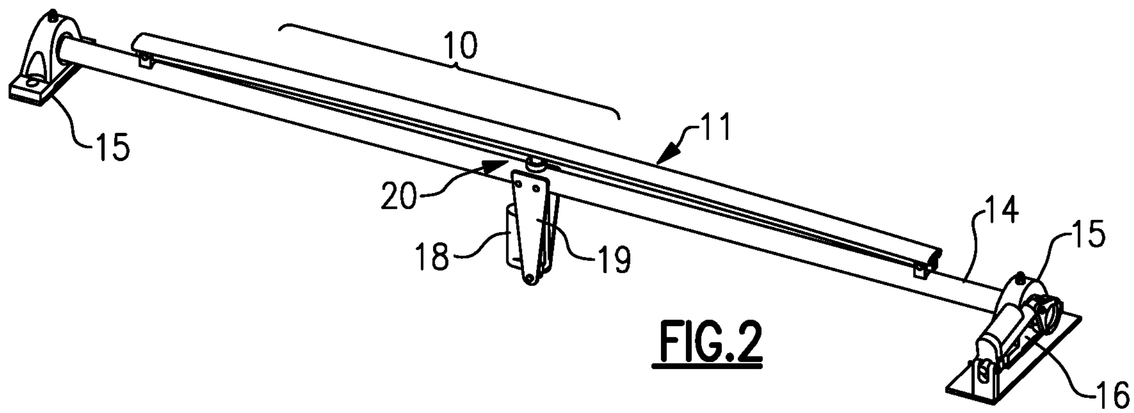
FIG. 2 is a perspective view of a bow spreader bar arrangement according to one embodiment of the present invention.
Figure 4:
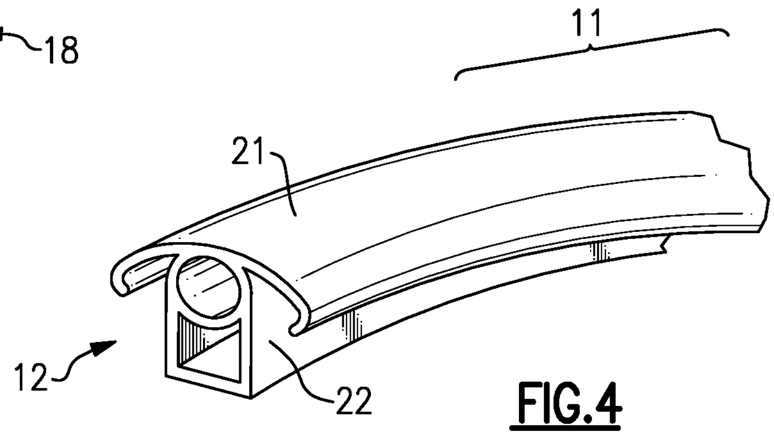
FIG. 4 is a perspective of the extrusion employed in the preferred embodiment as the bow spreader bar elongated arcuate member.

FIG. 2 illustrates generally one embodiment of the bow spreader bar assembly 10 of this invention. An arcuate or bowed spreader bar 11 can be adjusted in terms of the depth of the bow and also the pitch angle of the spreader bar relative to the associated film web. The bow spreader bar is in the form of an extrusion 12, which can be an elongated aluminum member having a generally T-shaped profile, as shown e.g., in FIG. 4, with a top portion 21 or cross-bar of the tee, being arcuate across its profile and with a tubular portion 22 forming the stem of the tee, and formed directly beneath the curved or arcuate top portion 21. The top portion 21 is convex, i.e., curved in the direction of travel of the web. The lower portion 22 can be present along the entire length of the extrusion 12 or, as in this arrangement, present only at the mid portion, with the stem portion of the tee being omitted away from the mid portion. In some embodiments, water, air or other cooling medium may be circulated though the tubular stem portion 22, with suitable fittings and hoses being employed in such case. A semi-rigid, low friction cover or cap 13 (see FIGS. 8 and 9) can have a profile similar to the top portion 21, so that it can be slid into place when needed and slid off for removal. Preferably, a low-friction treatment is applied onto the outer or convex surface of the top portion 21 to permit the plastic film to slide past and onto the take-up reel or spool.

Figure 3:
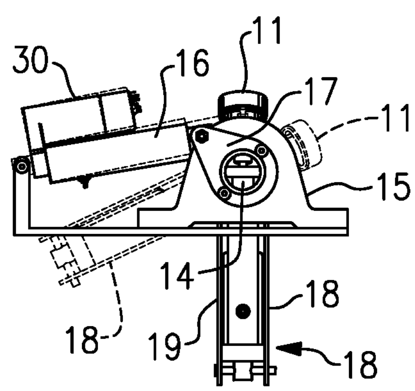
FIG. 3 is an end elevation of one end of the bow spreader bar arrangement of this embodiment

The arcuate spreader bar 11 is supported at its ends on a transverse rotatable support bar 14 which is rotationally supported at ends thereof on respective support bearings 15 which in turn are mounted onto frame members of the film processing equipment. As shown in FIG. 3, at one end of the assembly, where one end of the transverse support bar 14 is journalled in a respective one of the support bearings 15, an actuator 16, which may be an electrically powered gear motor with a linear action output shaft, has one end mounted to the frame of the equipment, and has another end, e.g., an output shaft, connected to a lever or crank member 17 affixed onto the support bar 14, so as to be able to rotate the support bar as well as the arcuate member 11 from a start position (approximately vertical as shown in solid line) to a rotated position (shown in broken line). A second actuator 18, here a linear actuator, is affixed onto a mid portion of the rotatable support bar onto a mount 19 that is attached to the bar 14. The second actuator 18 has a rod 20 that extends upwards through a penetration in the support bar 14 to a center portion of the arcuate bow spreader bar 11, e.g., as shown in FIG. 7.

Figure 5:
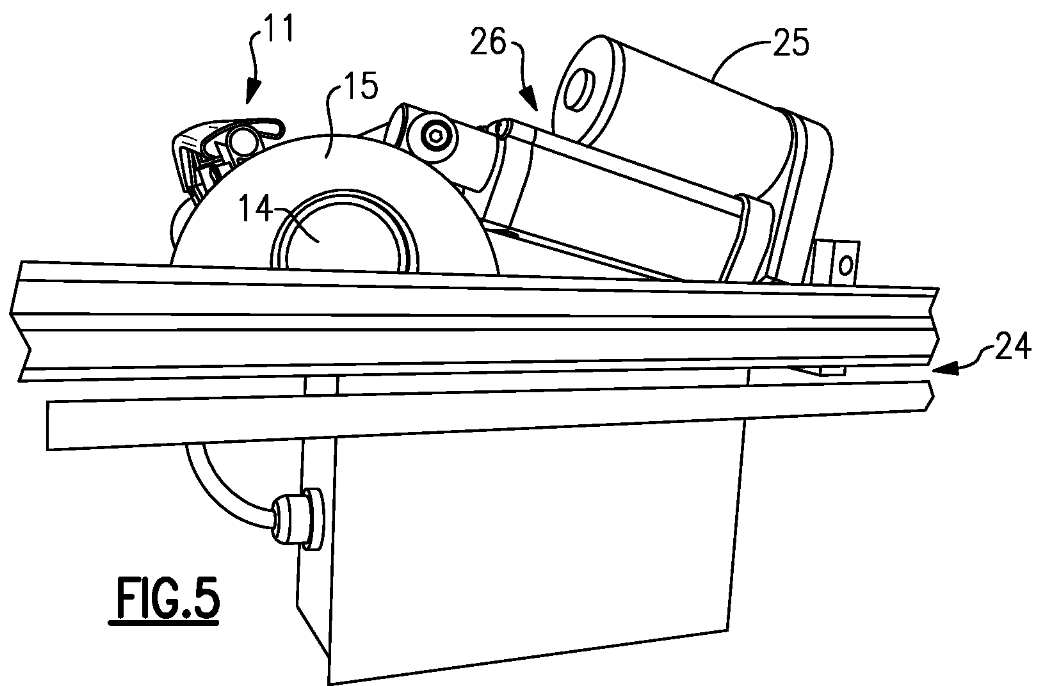
FIGS. 5 and 6 are end elevation views showing the first or rotational actuator mechanism of this embodiment.
Figure 6:
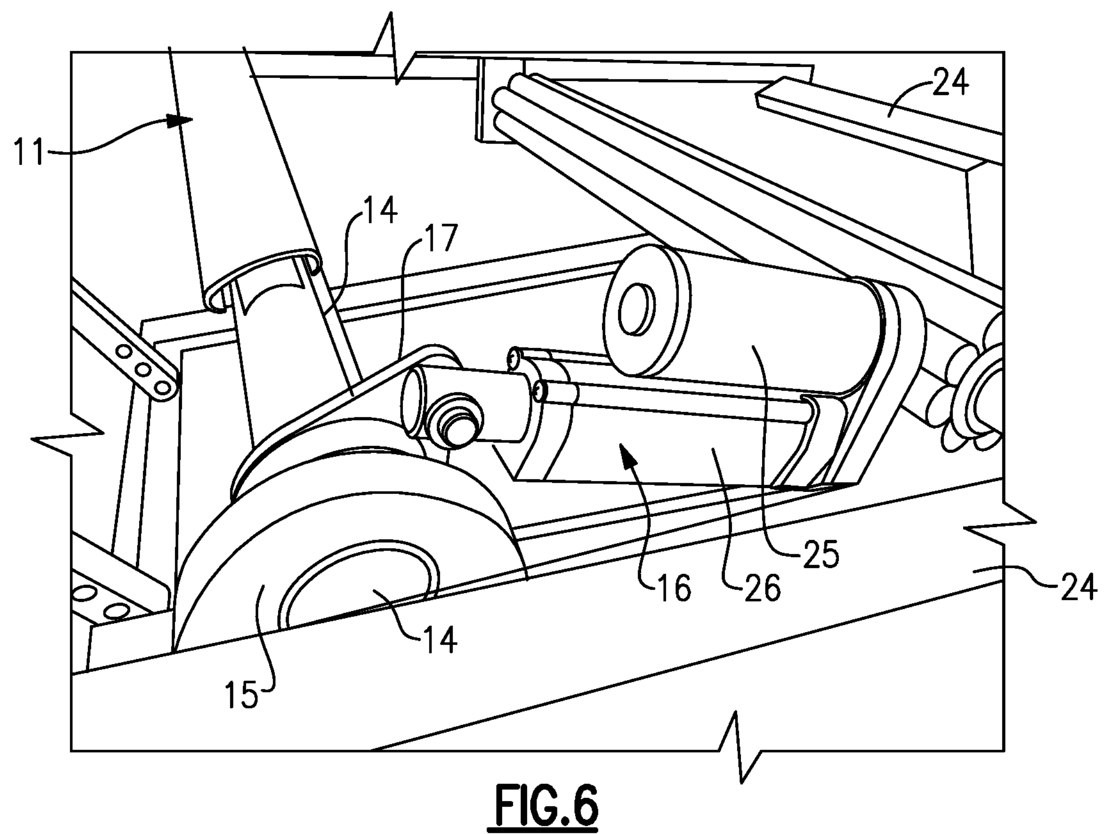

The actuators 16 and 18 and their relation to the bow spreader bar arrangement can be appreciated from FIGS. 5 and 6, where the bow spreader bar arrangement is mounted onto a frame 24 of the plastic film processing equipment. Here, the support bearings 15 for the transverse rotatable support bar 14 are shown with one end of the support bar 14 journaled in one of the support bearings 15. The actuator 16 is seen to include a gear motor 25 and a linear transmission 26 driven by the gear motor, and with an extendible end connected to the lever member 17 that is affixed onto the support bar 14. The linear transmission 26 can be selectively extended and retracted to rotate the support bar 14 and the bow spreader bar over an angular range, generally as indicated between the solid line and ghost representations of the bow spreader bar 11 in FIG. 3.

Details of the second actuator 18 in connection with the bow spreader bar 11 and the rotatable support bar 14 can be explained with reference to FIG. 7. As shown here, a frame 19 on which the linear actuator 18 is mounted is secured onto the center portion of the rotatable support bar 14, which is approximately the axial location of the mid portion of the arcuate bow spreader bar 11. As shown here, in a preferred arrangement there is a small section of the stem or tube portion 22 of the aluminum extrusion, with the curved top portion 21 of the extrusion extending out from the mid portion. The linear actuator 18 is mounted onto the mounting frame 19 that is affixed onto the rotatable support bar 14 at the location of the mid portion of the bow spreader bar also. As shown, an extendible and retractable rod 20 of the linear actuator extends out through an aperture in the support bar 14, and this rod 20 is fastened to the stem portion 22 of the bow spreader bar, and is thus configured to push the center portion of the bowed spreader bar radially out or to pull it radially back.

Figure 7:
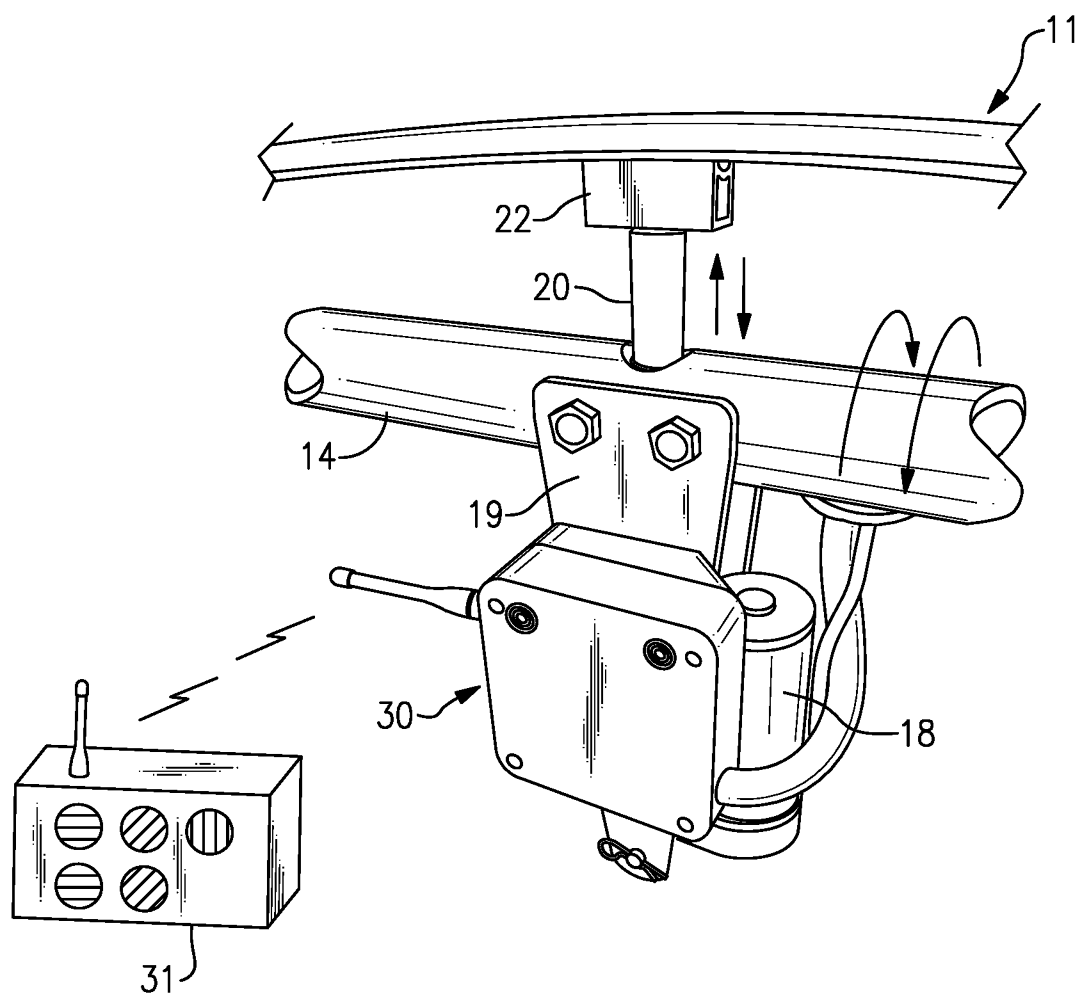
FIG. 7 is a perspective view of a center portion of the spreader bar arrangement featuring the second actuator and the remote controller transmitter and receiver portions.

As also shown in FIG. 7 a remote controller arrangement for controlling the rotation and positioning of the bow spreader bar arrangement. Here, the remote controller system includes a receiver 30 mounted onto the frame 19 for the second actuator and a remote transmitter 31, which may be a portable or hand-held device. The remote transmitter 31 here has push buttons to control the direction and amount of rotation of the support bar 14, i.e., pitch angle, and of the movement of the rod 20 of the second actuator 18, i.e., bowing of the bow spreader bar 12.

Figure 8:
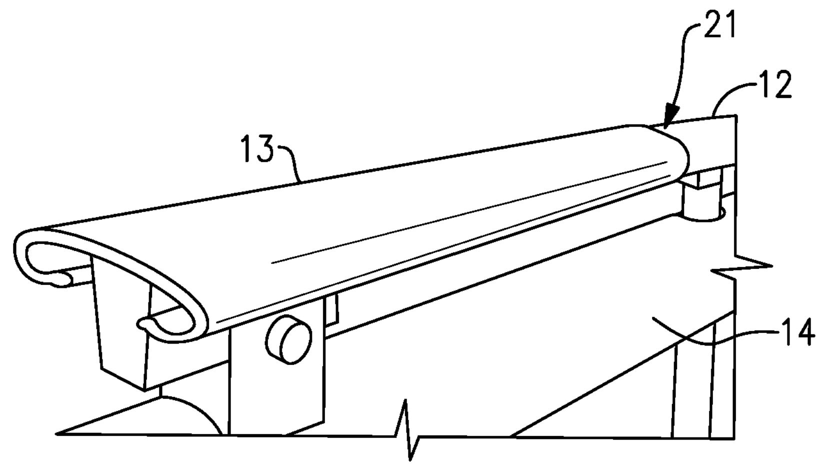
FIG. 8 and FIG. 9 show examples of the removable low-friction plastic cap portion, with FIG. 8 showing the cap portion being slid onto or off of the extruded arcuate member.
Figure 9:
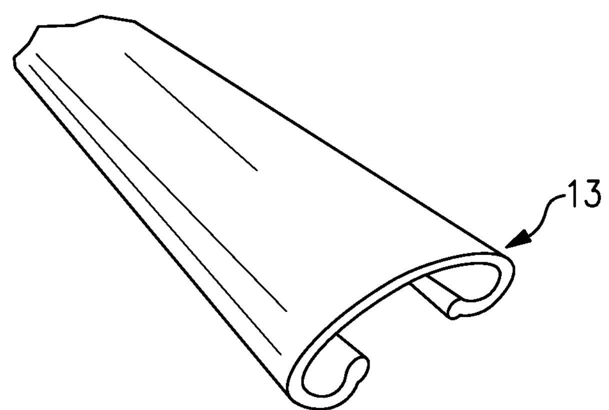

As mentioned earlier, the bow spreader bar can be used without the plastic low-friction cover 13, as the upper portion 21 is impregnated with a low-friction material as a surface treatment. However, in some cases a plastic cover e.g. 13 is preferred. As seen in FIGS. 8 and 9, the cover 13 may be extruded from a low-friction semi-rigid synthetic plastic resin to have an inside profile that conforms with the profile of the top portion 21 of the aluminum alloy extrusion. The cover easily slides onto the extruded arcuate bow spreader bar 11, and can be easily removed. As mentioned, a number of these covers 13 would be supplied, of different materials for various different plastic films. These covers 13 can be colored to identify the particular plastic film that it is intended to be used with.

Many other configurations are possible for the bow spreader bar arrangement and for the associated low friction covers.

While the invention has been described in respect to a preferred embodiment, it is to be understood that the invention is not limited to that embodiment. Rather, many modifications and variations of this bow spreader bar are possible according to the principles of this invention, which is to be reckoned in accordance with the accompanying claims.

What is claimed is:

1. A bow spreader bar for laterally stressing a web drawn therepast and which web is unwound from a supply roll, processed in a processing stage, and then rewound onto a take-up roll, the bow spreader bar comprising:

- an elongated arcuate member having first and second axial ends, and having a profile that defines a rounded surface on a convex face of the elongated arcuate member;
- an axial support member extending from a first rotary support member and a second rotary support member and on which the first and second ends of the elongated arcuate member are supported;
- a first actuator coupled to one end of said axial support member for controllably rotating said axial support member and said elongated arcuate member to adjust a pitch angle thereof;
- a second linear actuator mounted on said axial support member and having a rod extending therefrom to a center of said elongated arcuate member and configured to adjust the radial position of the center of the elongated arcuate member relative to the axial support member;
- a remote controller arrangement having a remote transmitter component distant from said bow spreader bar and a receiver component mounted on said bow spreader bar and coupled with said first and second actuators and adapted to permit an operator to adjust said pitch angle and said radial position from a location remote from the bow spreader bar.

2. The bow spreader bar according to claim 1 wherein said elongate arcuate member is formed as an extrusion having a generally T-shaped profile with a cap portion that is curved and a stem portion on which said cap portion is centered.

3. The bow spreader bar according to claim 1 wherein said rounded surface of said elongated arcuate member includes a low-friction surface treatment.

4. The bow spreader bar according to claim 1 wherein said elongated arcuate member includes a removable and replaceable cap member formed of a low-friction plastic resin and being shaped and adapted to slide onto the rounded surface of said elongated arcuate member.

5. The bow spreader bar according to claim 1 wherein said first actuator includes a linear motor fixed onto a support for said axial support member and a movable portion attached onto a lever fixed on said axial support member.

6. The bow spreader bar according to claim 5 wherein said second linear actuator is mounted on said axial support member radially opposite said elongated arcuate member, with the rod thereof extending through said axial support member to a mid portion of said elongated arcuate member.

7. The bow spreader bar according to claim 1 wherein the receiver component of said remote controller arrangement is mounted on said second linear actuator.

8. The bow spreader bar according to claim 7 wherein said receiver component and said transmitter component of said remote controller arrangement are configured to communicate wirelessly with one another.

* * * * *